US007280980B1

(12) United States Patent
Hoadley et al.

(10) Patent No.: US 7,280,980 B1
(45) Date of Patent: *Oct. 9, 2007

(54) ALGORITHM FOR EXPLAINING CREDIT SCORES

(75) Inventors: Bruce Hoadley, Berkeley, CA (US); Larry E. Rosenberger, San Rafael, CA (US); Andrew Flint, New York, NY (US)

(73) Assignee: Fair Isaac Corporation, Minneapolis, MN (US)

( * ) Notice: Subject to any disclaimer, the term of this patent is extended or adjusted under 35 U.S.C. 154(b) by 1384 days.

This patent is subject to a terminal disclaimer.

(21) Appl. No.: 09/919,074

(22) Filed: Jul. 30, 2001

Related U.S. Application Data

(63) Continuation-in-part of application No. 09/790,453, filed on Feb. 22, 2001.

(60) Provisional application No. 60/222,231, filed on Aug. 1, 2000, provisional application No. 60/222,205, filed on Aug. 1, 2000.

(51) Int. Cl.
G06Q 40/00 (2006.01)
(52) U.S. Cl. .......................................... 705/38; 705/35
(58) Field of Classification Search .................. 705/35, 705/38
See application file for complete search history.

(56) References Cited

U.S. PATENT DOCUMENTS

| 4,736,294 | A |   | 4/1988 | Gill |
|---|---|---|---|---|
| 4,876,592 | A |   | 10/1989 | Von Kohorn |
| 4,895,518 | A |   | 1/1990 | Arnold |
| 5,034,807 | A |   | 7/1991 | Von Kohorn |
| 5,259,766 | A |   | 11/1993 | Sack |
| 5,262,941 | A | * | 11/1993 | Saladin et al. ................. 705/38 |
| 5,611,052 | A |   | 3/1997 | Dykstra |
| 5,615,408 | A |   | 3/1997 | Johnson |
| 5,704,029 | A |   | 12/1997 | Wright |
| 5,732,400 | A |   | 3/1998 | Mandler |
| 5,774,883 | A |   | 6/1998 | Andersen |
| 5,793,972 | A |   | 8/1998 | Shane |
| 5,875,236 | A |   | 2/1999 | Jankowitz |
| 5,878,403 | A |   | 3/1999 | DeFrancesco |
| 5,930,764 | A |   | 7/1999 | Melchione |

(Continued)

FOREIGN PATENT DOCUMENTS

EP  0869652  10/1998

(Continued)

OTHER PUBLICATIONS

Singletary, Michelle. "Score One for Open Credit Ratings". The Washington Post. Washington, D.C. : Jun. 18, 2000. p. H 01, (3 pages).*

(Continued)

Primary Examiner—Andrew J. Fischer
Assistant Examiner—Elda Milef
(74) Attorney, Agent, or Firm—Michael A. Glenn; Glenn Patent Group

(57) ABSTRACT

An exemplary Web-based score explanation service typically requires only the credit bureau identifier, credit score, and up to four reason codes as input. The invention herein discloses an algorithm that is used to provide an explanation of the primary factors influencing the score, where a rich data feed is provided to the facility implementing the algorithm.

13 Claims, 2 Drawing Sheets

U.S. PATENT DOCUMENTS

| | | | |
|---|---|---|---|
| 5,930,776 | A | 7/1999 | Dykstra |
| 5,940,812 | A | 8/1999 | Tengel |
| 5,950,172 | A | 9/1999 | Klingman |
| 5,966,695 | A | 10/1999 | Melchione |
| 5,995,947 | A | 11/1999 | Fraser |
| 6,029,149 | A | 2/2000 | Dykstra |
| 6,064,987 | A | 5/2000 | Walker |
| 6,070,141 | A | 5/2000 | Houvener |
| 6,088,686 | A | 7/2000 | Walker |
| 6,094,643 | A | 7/2000 | Anderson |
| 6,105,007 | A | 8/2000 | Norris |
| 6,115,690 | A | 9/2000 | Wong |
| 6,119,103 | A | 9/2000 | Basch |
| 6,128,599 | A | 10/2000 | Walker |
| 6,128,603 | A | 10/2000 | Dent |
| 6,324,524 | B1 | 11/2001 | Lent et al. .................... 705/38 |
| 6,405,181 | B2 | 6/2002 | Lent |
| 6,567,791 | B2 | 5/2003 | Lent |
| 7,143,063 | B2 | 11/2006 | Lent |
| 2002/0077964 | A1* | 6/2002 | Brody et al. ................. 705/38 |

FOREIGN PATENT DOCUMENTS

| | | |
|---|---|---|
| EP | 0913789 | 5/1999 |
| WO | WO01/57720 | 8/2001 |

OTHER PUBLICATIONS

Stanton, Thomas H. "Credit Scoring and Loan Scoring as Tools for Improved Management of Federal Credit Programs." Financier. Philadelphia: Summer 1999. vol. 6, Iss. 2/3; p. 24 (15 pages).*

Data Validation Tips and Techniques—adnet.com, Sep. 1, 1999.

Powerforms: Declarative Client-Side Form Field Validation ISSN 1386-145x, Dec. 2000.

Occasional CF Newsletters, http://www.halhelms.com/index.cfm?fuseaction=newsletters.oct1999.

How Much Does a Low FICO Score Cost? Jul. 14, 2000, http://ficobuilder.com/kbsrch.htm, 2 pages.

Announcing TrueProfiler, Nov. 20, 2000, http://www.truecredit.com/index.asp, 2 pages.

TrueProfiler add on to any credit report for only $3.95, Nov. 20, 2000, http://www.truecredit.com/credit/TrueProfilerSample.asp, 10 pages.

FICO Guide Service, Nov. 20, 2000, https://www.ficoguide.com/sample_report.cfm, 10 pages.

Your ficobuilder.com order is here! Jul. 3, 2000, 46 pages.

Overview, Aug. 7, 2000, file:///Windy%20Hillo/Desktop%20Folder/Fair%20Isacc%20explainer%20call%20Irene/CreditXpert%AA, 12 pages.

* cited by examiner

ALGORITHM FOR EXPLAINING CREDIT SCORES

RELATION TO OTHER PATENT APPLICATIONS

This application is a continuation in part of U.S. patent application Ser. No. 09/790,453, filed Feb. 22, 2001, and claims priority to U.S. patent application Ser. No. 60/222,231, filed Aug. 1, 2000 and U.S. Ser. No. 60/222,205, filed Aug. 1, 2000.

BACKGROUND OF THE INVENTION

1. Technical Field

The invention relates to credit scoring. More particularly, the invention relates to an algorithm for explaining credit scores.

2. Description of the Prior Art

Recent events have made it desirable for developers of credit scoring algorithms, such as Fair, Isaac and Company, Inc. of San Rafeal, Calif. (FICO) to move toward offering a service to deliver cridit bureau risk scores and explanations directly to consumers and lenders. Consumer advocacy groups and cridit counseling organizations have provided positive feedback on these announced intentions. Additionally, cridit scoring developers clients, i.e. the credit grantors themselves, have expressed their understanding of the need to pursue this undertaking. Most organizations are comfortable that each credit scoring developer, such as Fair, Isaac, is the only entity in the market that can actively take on the role of credit score delivery and explanation.

A comprehensive score deliver and explanation service should include all of the following pieces:

1. Credit scores delivered to consumers.
2. The primary reason codes that describe why the score was not higher.
3. The consumer's credit bureau report from which the score was calculated to allow them to cross-reference the information with his/her actual credit report.
4. A personalized score explanation that describes to that consumer, in plain language, how their individual score was derived. This explanation service can be further enhanced using data elements present in the consumer's credit report.

Given the desirability of providing such information to consumers, it would be advantageous to provide a method and apparatus for explaining credit scores.

A. Flint, D. Lear, C. St. John, *Method and Apparatus for Explaining Credit Scores*, U.S. patent application Ser. No. 09/790,453 (Feb. 22, 2001) describe a Web site containing an array of informative resources including for-pay services and extranet functions to serve consumers and traditional players in the financial services industry, including financial counselors, mortgage brokers, direct lenders, large national credit issuers, and third-party credit report re-sellers, plus information seekers such as the press, consumer groups, and government agencies. A primary focus of the Flint et al. invention is to educate consumers, consumer groups, and the consumer press by offering them access to the exceptionally high-quality information, both general and personal, about the practices of collection, storing, reporting, and evaluating consumer credit data.

It would be advantageous to provide an algorithm for explaining credit scores, for example in connection with a credit score explanation service.

SUMMARY OF THE INVENTION

An exemplary Web-based score explanation service typically requires only the credit bureau identifier, credit score, and up to four reason codes as input. The invention herein discloses an algorithm that is used to provide an explanation of the primary factors influencing the score based upon a rich data feed.

DETAILED DESCRIPTION OF THE INVENTION

The presently preferred embodiment of the herein described algorithm for explaining credit scores is provided for use in conjunction with a credit score explanation service that may be implemented in any of several embodiments. The preferred embodiment of the invention operates in conjunction with a Web site containing an array of informative resources including for-pay services and extranet functions to serve consumers and traditional players in the financial services industry, including financial counselors, mortgage brokers, direct lenders, large national credit issuers, and third-party credit report re-sellers, plus information seekers such as the press, consumer groups, and government agencies. A primary focus of such Web site is to educate consumers, consumer groups, and the consumer press by offering them access to the exceptionally high-quality information, both general and personal, about the practices of collection, storing, reporting, and evaluating consumer credit data.

The working title of the Fair, Isaac and Company (FICO) Web presence is myFICO (myfico.com) because the most visible elements of the service are aimed directly at consumers who want to learn about their own FICO score.

Although the on-demand receipt of FICO scores is thought to be the primary draw to the site (based on consumer interest and press coverage), the invention also offers access to additional valuable services, such as registration in an opt-in/opt-out database, the ability to initiate requests for credit investigations, the ability to link to consumer credit counseling services should scores be low and represent high risk, and the ability to access multiple reports from different repositories upon request. These services heighten the level of consumer education, and also offer individuals access to information, actions, and preferences they have not had previously.

Additional benefit is to use myFICO.com to supply the consumer withtheir score and if that score is sufficient to pass the cutoff scores of specific brokers or lenders, the credit scoring developer can pass the consumer's name, application, and credit score on to the lender for consideration. The invention allows the credit scoring developer to build broker networks to refer these applicants to lenders who would approve them. The credit scoring developer can also link the applicants' email address to credit companies who wish to pre-approve and solicit these consumers based on score. This is a much more cost effective origination process (via email) than direct mail today.

Figure 1:
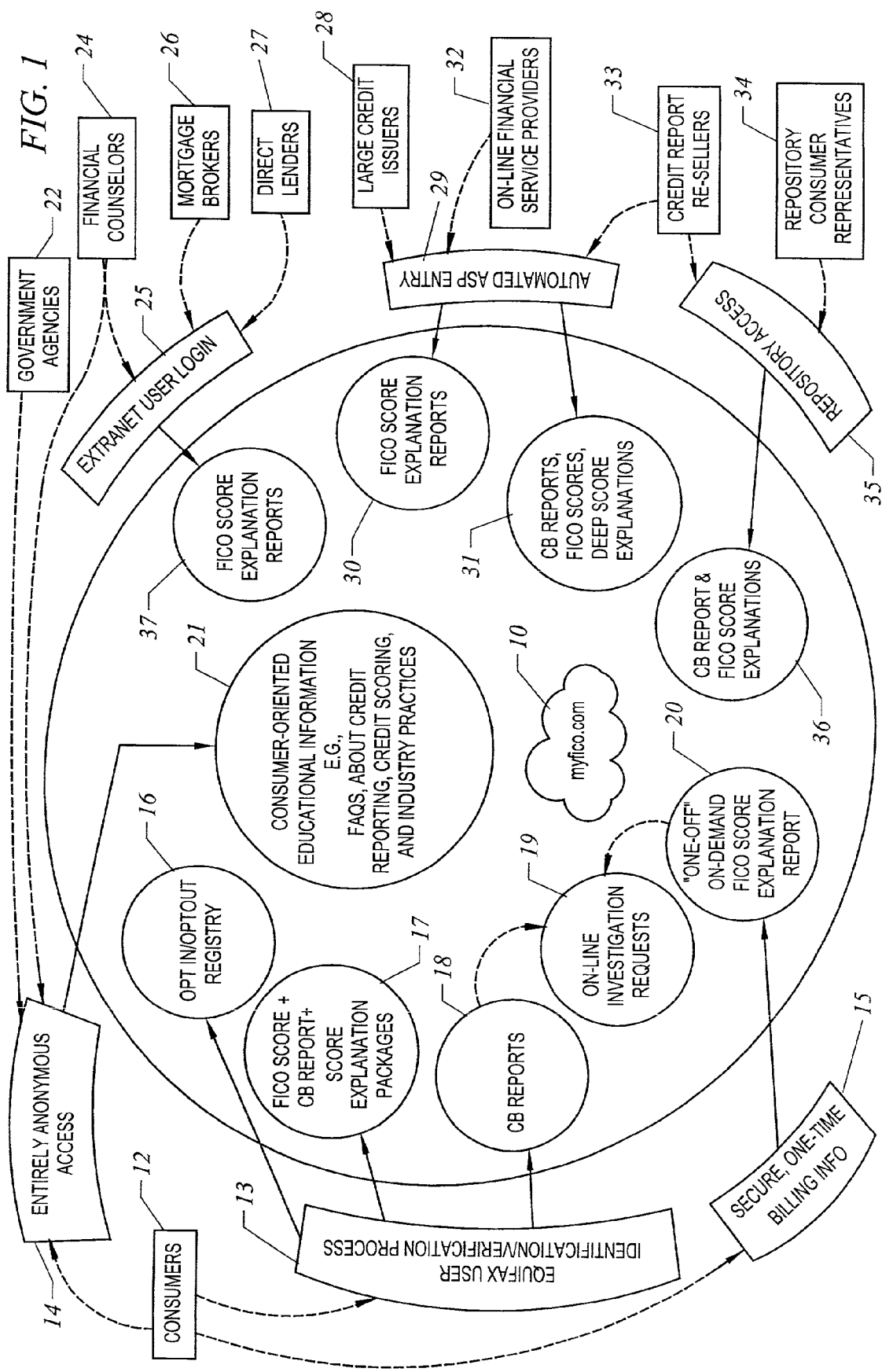
FIG. 1 is a block schematic diagram showing targeted users, access and entry points, and services provided by myFICO.com.

FIG. 1 is a block schematic diagram showing targeted users, access and entry points, and services provided by myFICO.com 10. Access by consumers 12 may be through a credit reporting agency 13, using an identification verification process to access credit score reports 17, for opt-in/opt-out requests 16, to access a report service 18, and to initiated on line investigations 19; through a secure, one time connection 15 for one-off credit score reports 20; or through an entirely anonymous access method 14 (the latter also allows access by government agencies 22) for consumer oriented information 21. myFICO.com also provided an extranet logon facility 25 to credit score reports 37 for such users as financial counselors 24, mortgage brokers 26, and direct lenders 27; an automated application service provider entry 29 to credit score reports 30 and other reports 31 for such users as large credit issuers 28, on line financial service providers 32, and credit report resellers 33; and repository access 35 to credit score reports and other reports 36 for repository consumer representatives 34 and credit report resellers 33. See A. Flint, D. Lear, C. St. John, *Method and Apparatus for Explaining Credit Scores,* U.S. patent application Ser. No. 09/790,453 (Feb. 22, 2001).

Score Explanation Service

An exemplary Web-based score explanation service requires, for example, only the credit bureau identifier, credit score, and up to four reason codes as input. In contrast, the invention herein discloses an algorithm that is used to provide an explanation of the primary factors influencing the score based upon a rich data feed. This algorithm can be enhanced depending upon the amount of input data available, although the use of an enhanced algorithm is optional and not considered to be a key element of the subject invention. The actual explanations may be selected as appropriate for the application to which the invention is put. Typical explanations are those described in A. Flint, D. Lear, C. S. John, *Method and Apparatus for Explaining Credit Scores,* U.S. patent application Ser. No. 09/790,453 (Feb. 22, 2001).

Figure 2:
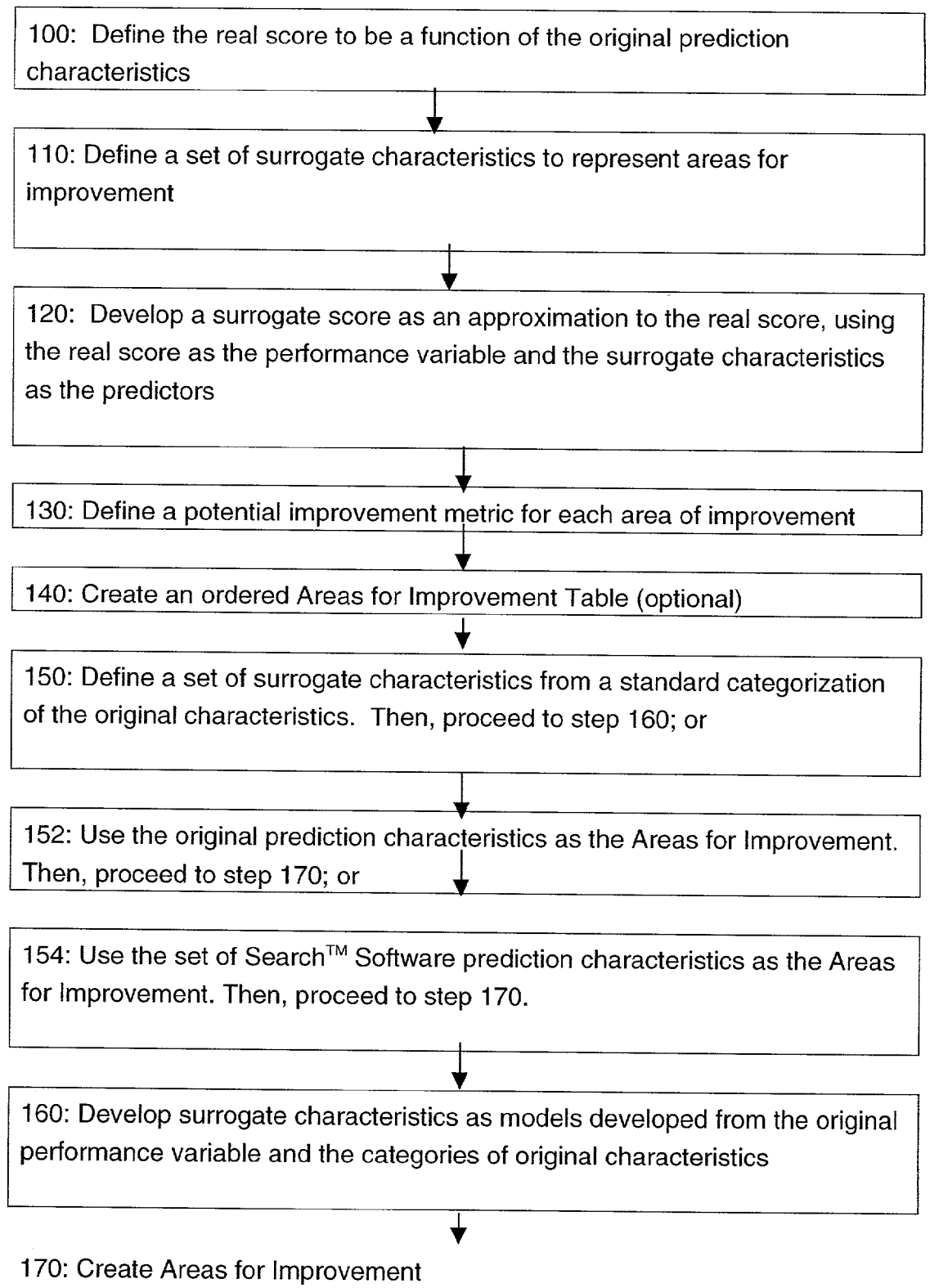
FIG. 2 is a flow diagram showing an algorithm for explaining credit scores according to the invention.

FIG. 2 is a flow diagram showing an algorithm for explaining credit scores according to the invention. The invention comprises a score explanation algorithm, which could be applied to any score. The presently preferred embodiment of the invention provides the basis for a general web-based score explanation service (see FIG. 1).

Score Explainer

Consider a score, which can be written as some function of a set of prediction characteristics (100)

$$\text{Score} = \zeta(X_1, X_2, \ldots, X_c),$$

where $X_j$=Prediction Characteristic j.

For a credit bureau risk score, there are about 80 prediction characteristics, which can include, for example, such characteristics as the number of trade lines with a current deliquency, although the actual number chosen when practicing the herein disclosed invention can vary depending upon the particular application to which the invention is put. If the score is a single scorecard, i.e. a scoring model where the score for an individual is the sum of their characteristic scores, and where the number of terms in this sum is the number of characteristics, so that, for each characteristic, the individual is assigned a score weight and then their final score is the sum these score weights, then it can be written in the form $$\text{Score} = \sum_{j=1}^{c} \zeta_j(\chi_j).$$

If the score is a segmented scorecard, i.e. where the population is segmented into mutually exclusive segments, and where a separate scorecard model is developed for each segment, then the formula is more complicated. For example the score weight associated with a particular value of a particular characteristic depends on what segment the individual is in. In such cases, the formula can be written down and analyzed. In fact, the invention disclosed herein works for any score, which can then be computed in a reasonably fast manner by application of the invention thereto.

To explain a score in detail, we define a set of surrogate characteristics, $z_1, z_2, \ldots, z_p$, which are labeled "Areas for improvement" (110). Areas for improvement include, for example, such factors as too much deliquency, too much debt, short credit history, etc. There are p Areas for Improvement, each area represented mathematically by a surrogate characteristic. Typically, p<c. For example, see below.

Use these Areas for Improvement surrogate characteristics to develop a surrogate score of the form $$\psi(z_1, z_2, \ldots, z_p),$$

which is developed using $z_1, z_2, \ldots, z_p$ as the prediction characteristics and $$Y = \zeta(X_1, X_2, \ldots, X_c)$$

as the performance (dependent) variable (120). Now consider the customer, who wants their score explained. Their actual score is $$\text{Score}^* = \zeta(X_1^*, X_2^*, \ldots, X_c^*)$$

and their values of $z_1, z_2, \ldots, z_p$ are $$z_1^*, z_2^*, \ldots, z_p^*.$$

A rich data feed with the values of the z's is needed, but not necessarily the values of the x's.

Associated with each Area for Improvement, define the potential improvement metric (130)

$$I_k = 100 \times \frac{\left[\max_{z_k}\{\psi(z_1^*(z_k), \ldots, z_k, \ldots, z_p^*(z_k)) - \psi(z_1^*, \ldots, z_k^*, \ldots, z_p^*)\}\right]}{\text{Score}^*}$$

= Maximum possible percent improvement for Area of Improvement $k$, where, e.g. $z_1^*(z_k) = z_1^*$ unless $z_1^*$ cannot coexist with $z_k$. In that case, $z_1^*(z_k) = E[z_1|z_k]$, or some other value of $z_1$ that can coexist with $z_k$.

Suppose that the values of the I's are ordered as follows:

$$I_4 > I_7 > I_2 > I_{11} > \ldots$$

Then one could optionally create an ordered Area for Improvement table of the form shown in Table "A" below (140).

TABLE A

Areas for Improvement

| Areas for Improvement | Potential Percent Improvement in Score |
|---|---|
| 4 | $I_4$ |
| 7 | $I_7$ |
| 2 | $I_2$ |
| 11 | $I_{11}$ |
| . | . |
| . | . |
| . | . |

The number of Areas for Improvement listed would be small relative to the value of p.

Definitions of the Areas for Improvement

In the simple case, one could use the original prediction characteristics as the Areas for Improvement (152). However, in cases such as the credit bureau risk score, this would yield too many Areas for Improvement.

Another possibility is to use the set of prediction characteristics, which are computed, for example, as part of Fair Isaac's Search™ Software product as the Areas for Improvement (154). When Search™ goes to the credit bureau to get information on a person, these Search™ prediction characteristics are returned. The Search™ Software product improves origination decision making by automatically obtaining credit bureau reports and scores from the major North American consumer credit bureaus, as well as providing comprehensive and sophisticated analysis (see http://www.fairisaac.com/index.html) In Search™ there are about 40 characteristics.

Another approach is to define a set of surrogate characteristics from some standard categorization of the credit bureau characteristics that go into scores (150). The categories listed on a Fair Isacc Web page (see http://www.myfico.com/filfsf.html) are (i) Payment history, (ii) Amounts Owed, (iii) Length of credit history, (iv) New credit, and (v) Types of credit use. Suppose that the 80 original characteristics are categorized into the five categories above as follows:

Category 1: $x_1, x_2, \ldots, x_{15}$

Category 2: $x_{16}, x_2, \ldots, x_{35}$

Category 3: $x_{36}, x_2, \ldots, x_{50}$

Category 4: $x_{51}, x_2, \ldots, x_{65}$

Category 5: $x_{56}, x_2, \ldots, x_{80}$

Then one could develop a surrogate characteristic of the form $$z_1 = \phi_1(x_1, x_2, \ldots, x_{15}),$$

where $$\phi_1(x_1, x_2, \ldots, x_{15})$$

is a score developed using $x_1, x_2, \ldots, x_{15}$ as the prediction characteristics and the real credit score as the performance (dependent) variable (160). The variables $z_2, z_3, \ldots, z_5$ could be developed in a similar way.

This creates five possible Areas for Improvement (170), which might be too small. Each of the above categories could be broken into several sub-categories to create more Areas for Improvement.

The three approaches described above are shown on FIG. 2 as alternatives.

Discussion

Reason Codes

The following discussion of the invention is a generalization of the technique used today for computing reason codes. Associated with a person's score is a set of about four reason codes, which can be easily returned from a credit bureau along with the score value. In the background, associated with each reason code, is a score difference. These score differences are defined slightly differently than the score differences in the formula for $I_k$ but they could be converted to percentages in the same way that the score differences are converted to percentages. This idea is readily implemented with a data feed, which includes the score differences associated with the reason codes.

Segment Split Variables

The above formula for $I_k$ takes into account automatically and precisely the split variables used to define the segments in a segmented score. The maximization over $z_k$ for a split variable involves the computation of the customer's score in several segments, because, as $z_k$ varies over its range, one moves from segment to segment.

Rich Data Feed

The presently preferred embodiment of the herein disclosed invention requires a rich data feed, i.e. the values of the z*'s. However, the values of the x*'s are not needed, unless they are the same as the z*'s.

Number of Areas for Improvement

In the preferred embodiment, the total number of Areas for Improvement could be just about any number between five and 80. However, showing the customer the typical top four is presently preferred. The total number is preferably significantly more than four, i.e. five is too small. Twenty is presently preferred. This means that the five categories mentioned above in connection with the Fair Isaac site should be expanded to about twenty. The original 80 prediction characteristics should be put into about twenty categories.

Generality

The algorithm described herein would work for any score, which can then be computed in a reasonably fast manner by application of the invention herein thereto. This includes neural networks and regression trees.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A method for explaining credit scores, comprising the steps of providing a Web site that contains informative resources, said Web site comprising any of for-pay services and extranet/Internet functions; offering consumers access to information contained in said informative resources, the resources being, both general and personal, about practices comprising any of collection, storing, reporting, and evaluating consumer credit data; accepting consumer credit scores and reason codes from individual consumers or third parties, in interactive or batch modes; and providing an explanation report to said individual consumers based upon the individual consumers' credit scores, said method for explaining credit scores further comprising the steps of:

defining a credit score as a function of prediction characteristics;

defining a surrogate set of characteristics as representing areas for improvement;

developing a surrogate score to approximate a real credit score, using said real credit score as a performance (dependent) variable and using said surrogate characteristics as predictors; and defining a potential improvement metric for each area for improvement;

wherein said developing a surrogate score step further comprises the step of:

using said areas for improvement prediction variables to develop a surrogate score of the form $$\psi(z_1, z_2, \ldots, z_p),$$

which is developed using $z_1, z_2, \ldots, z_p$ as said prediction characteristics and $$Y = \zeta(X_1, X_2, \ldots, X_c)$$

as said performance variable; and wherein said defining a potential improvement metric step is defined as:

$$I_k = 100 \times \frac{\max_{z_k}\{\psi(z_1^*(z_k), \ldots, z_k, \ldots, z_p^*(z_k)) - \psi(z_1^*, \ldots, z_k^*, \ldots, z_p^*)\}}{Score^*}$$

= Maximum possible percent improvement in score for Area of Improvement $k$, where $z_1^*(z_k) = z_1^*$ unless $z_1^*$ cannot coexist with $z_k$, wherein in that case, $z_1^*(z_k) = E[z_1|z_k]$, or some other value of $z_1$ that can coexist with $z_k$.

2. The method of claim 1, further comprising the step of: creating an ordered areas for improvement table.

3. The method of claim 1, further comprising the step of: using said surrogate characteristics as said areas for improvement.

4. The method of claim 1, wherein said defining a credit score step is defined as:

$$Score = \zeta(x_1, x_2, \ldots x_c),$$

where $x_j$ = Prediction Characteristic j.

5. The method of claim 1, further comprising the steps of:

associating a set of reason codes with a score returned from a credit bureau;

associating a score difference with each reason code;

providing a data feed which includes score differences associated with said reason codes; and coverting score differences to percentages.

6. The method of claim 1, further comprising the step of: comparing a current score to a maximum score that can be obtained by varying said prediction characteristic.

7. A credit score explanation system; comprising a Web site that contains informative resources, said Web site comprising any of for-pay services and extranet/Internet functions; said Web site offering any of consumers and said third parties access to information contained in said informative resources, the resources being both general and personal, about practices of any of collection, storing, reporting, and evaluating consumer credit data; a mechanism for accepting consumer credit scores and reason codes from any of individual consumers or third parties, in interactive or batch-modes; and providing an explanation report to said individual consumers based upon the individual consumers' credit scores an apparatus for explaining credit scores comprising:

means for defining a credit score as a function of prediction characteristics;

means for defining a surrogate set of characteristics as representing areas for improvement;

means for developing a surrogate score to approximate a real credit score, using said real credit score as a performance (dependent) variable and using said surrogate characteristics as predictors;

wherein said developing a surrogate score step further comprises:

using said areas for improvement prediction variables to develop a surrogate score of the form $$\psi(z_1, z_2, \ldots, z_p),$$

which is developed using $z_1, z_2, \ldots, z_p$ as said prediction characteristics and $$Y = \zeta(X_1, X_2, \ldots, X_c)$$

as said performance variable; and means for defining a potential improvement metric for each area for improvement;

wherein said means for defining a potential improvement metric step is defined as:

$$I_k = 100 \times \frac{\max_{z_k}\{\psi(z_1^*(z_k), \ldots, z_k, \ldots, z_p^*(z_k)) - \psi(z_1^*, \ldots, z_k^*, \ldots, z_p^*)\}}{Score^*}$$

= Maximum possible percent improvement in score for Area of Improvement $k$, where $z_1^*(z_k) = z_1^*$ unless $z_1^*$ cannot coexist with $z_k$, wherein in that case, $z_1^*(z_k) = E[z_1|z_k]$, or some other value of $z_1$ that can coexist with $z_k$.

8. The apparatus of claim 7, further comprising: means for creating an ordered areas for improvement table.

9. The apparatus of claim 7, further comprising: means for using said surrogate characteristics as said areas for improvement.

10. The apparatus of claim 7, wherein said means for defining a credit score comprises:

$$Score = \zeta(x_1, x_2, \ldots, x_c),$$

where $x_j$ = Prediction Characteristic j.

11. The apparatus of claim 7, wherein said developing a surrogate score step further comprises:

means for using said areas for improvement prediction variables to develop a surrogate score of the form $$\psi(z_1, z_2, \ldots, z_p),$$

which is developed using $z_1, z_2, \ldots, z_p$ as said prediction characteristics and $$Y = \zeta(X_1, X_2, \ldots, X_c)$$

as said performance variable.

12. The apparatus of claim 7, further comprising:

means for associating a set of reason codes with a score returned from a credit bureau;

means for associating a score difference with each reason code;

means for providing a data feed which includes score differences associated with said reason codes; and means for converting score differences to percentages.

13. The apparatus of claim 7, further comprising:

means for comparing a current score to a maximum score that can be obtained by varying said prediction characteristic.

* * * * *